US012644972B2

(12) United States Patent
Yamamoto et al.

(10) Patent No.: US 12,644,972 B2
(45) Date of Patent: Jun. 2, 2026

(54) DISTANCE MEASUREMENT APPARATUS

(71) Applicant: DENSO CORPORATION, Kariya-city (JP)

(72) Inventors: Masahiro Yamamoto, Kariya-city (JP); Tetsumasa Kawaguchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 931 days.

(21) Appl. No.: 17/930,667

(22) Filed: Sep. 8, 2022

(65) Prior Publication Data

US 2023/0003854 A1    Jan. 5, 2023

Related U.S. Application Data

(63) Continuation of application No. PCT/JP2021/008983, filed on Mar. 8, 2021.

(30) Foreign Application Priority Data

Mar. 12, 2020    (JP) ................................. 2020-042800

(51) Int. Cl.
| | | |
|---|---|---|
| *G01S 7/497* | (2006.01) | |
| *G01S 7/481* | (2006.01) | |
| *G01S 17/08* | (2006.01) | |
| *G01S 17/931* | (2020.01) | |

(52) U.S. Cl.
CPC ............ *G01S 7/497* (2013.01); *G01S 7/4813* (2013.01); *G01S 7/4817* (2013.01); *G01S 17/08* (2013.01); *G01S 17/931* (2020.01); *G01S 2007/4975* (2013.01)

(58) Field of Classification Search
CPC ...... G01S 7/497; G01S 7/4813; G01S 7/4817; G01S 17/08; G01S 17/931; G01S 2007/4975; G01S 2007/4977
USPC ......................................................... 356/4.01
See application file for complete search history.

(56) References Cited

U.S. PATENT DOCUMENTS

2014/0320845 A1    10/2014    Bayha et al.

*Primary Examiner* — Daniel L Murphy
(74) *Attorney, Agent, or Firm* — Precision Patents, P.C.

(57) ABSTRACT

A distance measurement apparatus measures a distance to an object by irradiating emission light and detecting reflected light from the object onto which the emission light is irradiated. This apparatus includes a transmission window, a heater wire, and a flexible substrate that is provided in the transmission window. The flexible substrate includes: a surface-mounted-type electronic component; a land to which an electrode of the electronic component is electrically connected, and a conductive adhesive that is formed on the land and adheres the electrode of the electronic component and the land. When a longitudinal direction of a surface of the electronic component that opposes the land is a reference direction, a length along the reference direction of a contact surface between the land and the conductive adhesive is equal to or greater than twice a length along the reference direction of a mounting surface of the electrode of the electronic component.

5 Claims, 10 Drawing Sheets

DISTANCE MEASUREMENT APPARATUS

CROSS-REFERENCE TO RELATED APPLICATIONS

The present application is a continuation application of International Application No. PCT/JP2021/008983, filed on Mar. 8, 2021, which claims priority to Japanese Patent Application No. 2020-042800, filed on Mar. 12, 2020. The contents of these applications are incorporated herein by reference in their entirety.

BACKGROUND

Technical Field

The present disclosure relates to a distance measurement apparatus.

Related Art

A distance measurement apparatus that is mounted to a vehicle and measures a distance to an object that is present ahead of the vehicle is known. As this apparatus, there is a distance measurement apparatus that irradiates emission light towards a front side, detects reflected light of the irradiated emission light from the object, and thereby measures the distance to the object.

SUMMARY

One aspect of the present disclosure provides a distance measurement apparatus that measures a distance to an object by irradiating emission light and detecting reflected light from the object onto which the emission light is irradiated. The distance measurement apparatus includes a transmission window, a heater wire, and a flexible substrate. The transmission window is configured such that the emission light and the reflected light pass therethrough. The heater wire heats the transmission window. The flexible substrate is provided in the transmission window. The flexible substrate includes a surface-mounted-type electronic component, a land, and a conductive adhesive. An electrode of the electronic component is electrically connected to the land. The conductive adhesive is formed on the land and adheres the electrode of the electronic component and the land. When a longitudinal direction of a surface of the electronic component that opposes the land is a reference direction, a length along the reference direction of a contact surface between the land and the conductive adhesive is equal to or greater than twice a length along the reference direction of a mounting surface of the electrode of the electronic component

BRIEF DESCRIPTION OF THE DRAWINGS

In the accompanying drawings:

FIG. 8 is an enlarged view of a portion VIII shown in FIG. 6;

FIG. 9 is an enlarged view of a portion IX shown in FIG. 5; and

DESCRIPTION OF THE EMBODIMENTS

Figure 1:
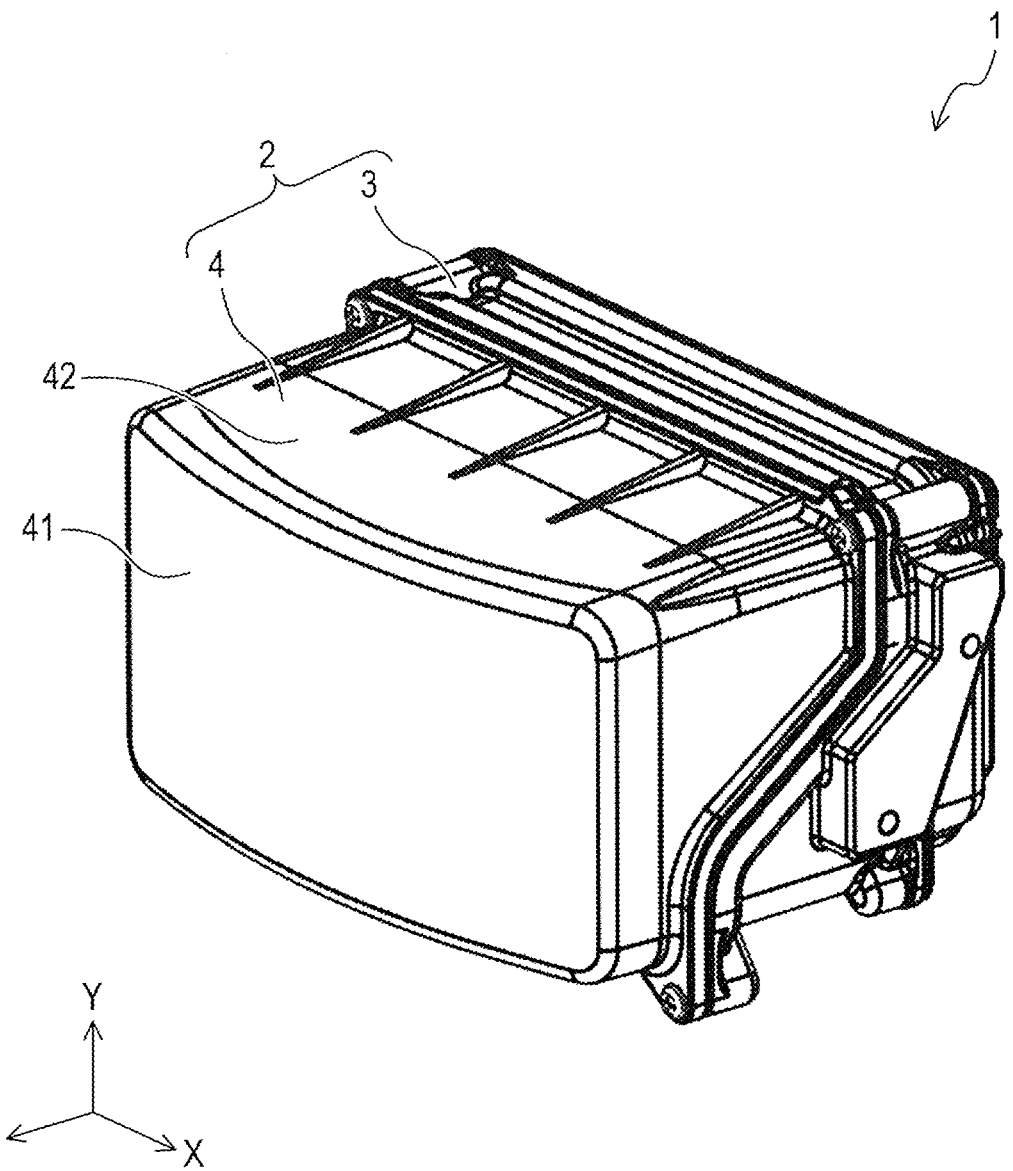
FIG. 1 is a perspective view of an outer appearance of a distance measurement apparatus.

As a distance measurement apparatus that is mounted to a vehicle and measures a distance to an object that is present ahead of the vehicle, there is a distance measurement apparatus that irradiates emission light towards a front side, detects reflected light of the irradiated emission light from the object, and thereby measures the distance to the object.

The distance measurement apparatus typically has a casing. An irradiating unit that irradiates the emission light and a detecting unit that detects the reflected light are housed inside the casing. A transmission window through which the emission light and the reflected light pass is provided on a front side of the casing.

However, if snow, rainwater, or the like becomes attached to the transmission window, measurement accuracy of the distance measurement apparatus may decrease.

Therefore, JP-A-2015-506459 describes that, to remove snow, rainwater, and the like that is attached to the transmission window, the transmission window is provided with a heater that heats the transmission.

As the distance measurement apparatus in which the transmission window is provided with a heater, the inventors of the present disclosure examined a configuration in which a flexible substrate in which a heater wire is formed is adhered to the transmission window. As a result, following issues were found.

An electronic component other than the heater wire may also be mounted on the flexible substrate. For example, as the electronic component, a thermistor that detects a temperature of the transmission window and is used for heating control of the transmission window may be used. In addition, for example, the electronic component may be fixed to the flexible substrate via a conductive adhesive.

When such a flexible substrate in which the heater wire is formed is used, a temperature of the electronic component that is mounted on the flexible substrate also increases in accompaniment with the heating of the transmission window. As a result of heating control of the transmission window being repeatedly performed, thermal expansion and thermal contraction of the electronic component are repeated. Consequently, peeling may occur at a boundary between the conductive adhesive and the flexible substrate due to difficulty in keeping up with the thermal expansion and the thermal contraction of the electronic component, and electrical reliability may decrease.

It is thus desired to provide a distance measurement apparatus in which peeling does not easily occur in an adhesive portion of an electronic component that is mounted on a flexible substrate and electrical reliability is high.

An exemplary embodiment of the present disclosure provides a distance measurement apparatus that is configured to measure a distance to an object by irradiating emission light and detecting reflected light from the object onto which the emission light is irradiated. The distance measurement apparatus includes a transmission window, a heater wire, and a flexible substrate. The transmission window is configured such that the emission light and the reflected light pass therethrough. The heater wire is configured to heat the transmission window. The flexible substrate is provided in the transmission window. In addition, the flexible substrate includes a surface-mounted-type electronic component, a land, and a conductive adhesive. An electrode of the electronic component is electrically connected to the land. The conductive adhesive is formed on the land and adheres the electrode of the electronic component and the land. When a longitudinal direction of a surface of the electronic component that opposes the land is an A direction (corresponding to a reference direction), a length along the A direction of a contact surface between the land and the conductive adhesive is equal to or greater than twice a length along the A direction of a mounting surface of the electrode of the electronic component According to this configuration, a distance measurement apparatus in which peeling does not easily occur in an adhesive portion of an electronic component that is mounted on a flexible substrate and electrical reliability is high is provided.

An exemplary embodiment of the present disclosure will hereinafter be described with reference to the drawings.

1. Overall Configuration

A distance measurement apparatus 1 shown in FIG. 1 is a LIDAR apparatus that measures a distance to an object by irradiating emission light and detecting reflected light from the object onto which the emission light is irradiated. LIDAR is an abbreviation of Light Detection and Ranging. The distance measurement apparatus 1 is used so as to be mounted to a vehicle and is used to detect various objects that are present ahead of the vehicle.

As shown in FIG. 1, the distance measurement apparatus 1 includes a casing 2. The casing 2 is a box body that is composed of resin and formed into a rectangular parallelepiped.

The casing 2 includes a casing main body 3 and a cover 4. A transmission window 41 through which the emission light and the reflected light pass is provided on a front side of the cover 4 as a portion of the cover 4. The front side herein refers to a direction of an irradiation destination of the emission light in the casing 2.

Hereafter, in a state in which the distance measurement apparatus 1 is set in the vehicle, a left/right direction when the transmission window 41 is viewed from the front is an X-axis direction, an up/down direction when the transmission window 41 is viewed from the front is a Y-axis direction, and a direction that is orthogonal to an X-Y plane is a Z-axis direction. The Z-axis direction is also referred to as a front/rear direction of the casing 2.

Figure 2:
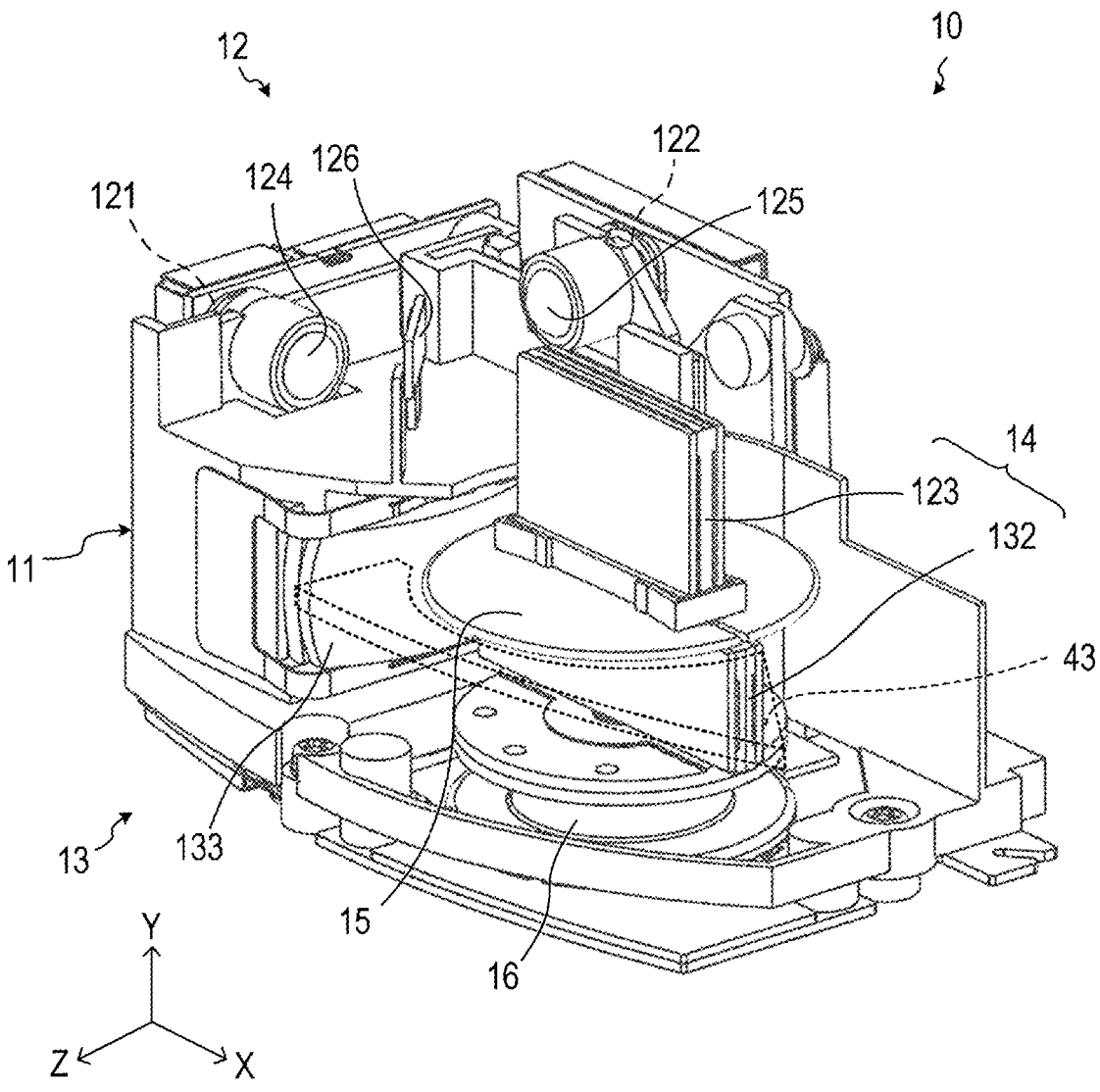
FIG. 2 is a perspective view of a configuration of a detection module.

A detection module 10 shown in FIG. 2 is housed inside the casing 2. The detection module 10 is assembled to the casing main body 3 by a frame 11 that is configured by a plurality of components.

A configuration of the detection module 10, a configuration of the cover 4, and a configuration of a flexible substrate 5 that is provided in the transmission window 41 will be described in detail below.

2. Configuration of the Detection Module

Figure 3:
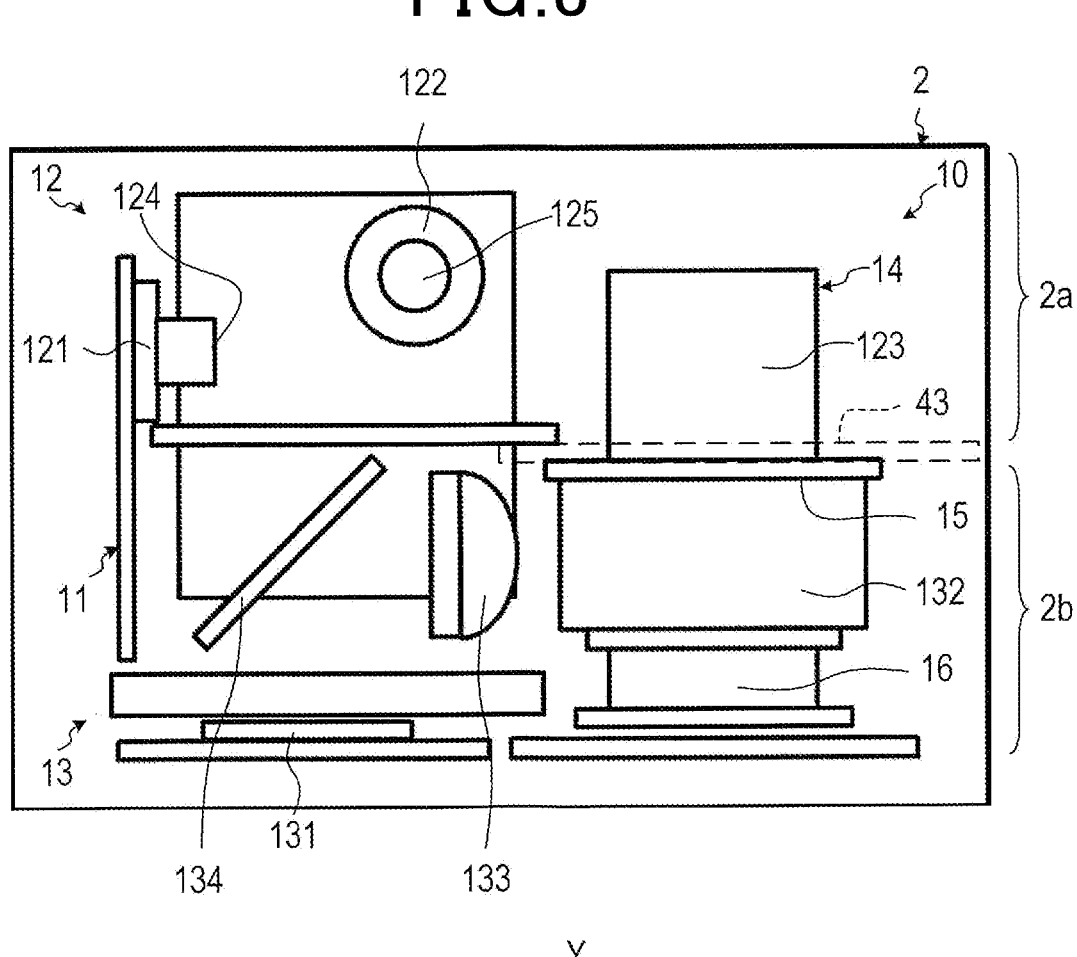
FIG. 3 is a schematic diagram illustrating a configuration of an interior of a casing, from a front view.

As shown in FIG. 2 and FIG. 3, the detection module 10 includes an irradiating unit 12, a detecting unit 13, an intermediate plate 15 that is provided between the irradiating unit 12 and the detecting unit 13, and a motor 16. Here, in FIG. 3, many components of the frame 11 and the like are omitted to facilitate visibility of the configuration of the detection module 10.

The configuration of the detection module 10 will be described in detail below.

2-1. Irradiating Unit

The irradiating unit 12 is housed in a space in an upper portion of an interior of the casing 2. The irradiating unit 12 is configured to irradiate the emission light that is scanned along a scanning direction that is set in advance.

As shown in FIG. 2, the irradiating unit 12 includes two light sources 121 and 122, and an irradiating mirror 123. In addition, the irradiating unit 12 may include two irradiation-side lenses 124 and 125, and an irradiation-side reflecting mirror 126.

A semiconductor laser is used for each of the light sources 121 and 122.

The irradiating mirror 123 is a plate-shaped member in which two deflecting mirrors that reflect light are attached on both surfaces. The irradiating mirror 123 rotates around a rotation axis along the Y-axis direction, based on driving of the motor 16 described hereafter.

The irradiation-side lens 124 is a lens that is arranged so as to oppose a light emitting surface of the light source 121. In a similar manner, the irradiation-side lens 125 is a lens that is arranged so as to oppose a light emitting surface of the light source 122.

The irradiation-side reflecting mirror 126 is a mirror that changes an advancing direction of light.

The light source 121 is arranged such that light that is outputted from the light source 121 and passes through the irradiation-side lens 124 is directly incident on the irradiating mirror 123.

The light source 122 and the irradiation-side reflecting mirror 126 are arranged such that the advancing direction of light that is outputted from the light source 122 and passes through the irradiation-side lens 125 is bent by about 90° by the irradiation-side reflecting mirror 126 and incident on the irradiation mirror 123.

Here, the light source 121 is arranged on the left side of the casing 2 so as to output light towards the right side. The light source 122 is arranged on the rear side of the casing 2 so as to output light towards the front side. In addition, the irradiation-side reflecting mirror 126 is arranged so as not to block a path of light from the light source 121 towards the irradiation mirror 123.

The irradiating unit 12 is configured to irradiate light by operating in a following manner. The light that is outputted from the light source 121 is incident on the irradiation mirror 123 through the irradiation-side lens 124. In addition, the advancing direction of the light that is outputted from the light source 122 is bent by about 90° by the irradiation-side reflecting mirror 126 after passing through the irradiation-side lens 125, and the light is incident on the irradiating mirror 123. The light that is incident on the irradiating mirror 123 is emitted towards a direction that is based on a rotation angle of the irradiating mirror 123, through the transmission window 41. A range over which the light is irradiated through the irradiation mirror 123 is a scanning range. For example, a range of ±60° about the X-axis direction with a frontward direction along the Z axis as 0 degrees may be set as the scanning range.

2-2. Detecting Unit

The detecting unit 13 is housed in a space in a lower portion of the interior of the casing 2. The detecting unit 13 is configured to detect reflected light from an object that arrives from the scanning range.

As shown in FIG. 3, the detecting unit 13 includes a light receiving element 131 and a detecting mirror 132. The detecting unit 13 may also include a detection-side lens 133 and a detection-side reflecting mirror 134.

The light receiving element 131 has an APD array in which a plurality of APDs are arranged in a single row. APD refers to an avalanche photodiode.

In a manner similar to the irradiating mirror 123, the detecting mirror 132 is a plate-shaped member in which two deflecting mirrors that reflect light are attached to both surfaces. In addition, in a manner similar to the irradiating mirror 123, the detecting mirror 132 rotates around a rotation axis along the Y-axis direction, based on driving of the motor 16 described hereafter.

The detection-side lens 133 is a lens that focuses light that arrives from the scanning range.

The detection-side reflecting mirror 134 is a mirror that changes the advancing direction of light.

The light receiving element 131 is arranged in a portion below the detection-side reflecting mirror 134.

The detection-side reflecting mirror 134 is arranged so as to bend a path of light downward by about 90° such that light that is incident from the detecting mirror 132 through the detection-side lens 133 reaches the light receiving element 131.

The detection-side lens 133 is arranged between the detecting mirror 132 and the detection-side reflecting mirror 134. The detection-side lens 133 focuses a light beam that is incident on the light receiving element 131 such that a beam diameter thereof is about an element width of the APD.

The detecting unit 13 detects the reflected light from an object by operating in a following manner. The reflected light from an object that is positioned in a predetermined direction based on the rotation angle of the detecting mirror 132, that is, an emission direction of light from the irradiation mirror 123 passes through the transmission window 41 of the casing 2 and is incident on the detecting mirror 132. The reflected light is reflected by the detecting mirror 132 and is detected by the light receiving element 131 through the detection-side lens 133 and the detection-side reflecting mirror 134.

2-3. Intermediate Plate and Motor

The intermediate plate 15 is provided between the irradiating mirror 123 and the detecting mirror 132. The intermediate plate 15 is a circular and plate-shaped member that extends in a horizontal direction. As shown in FIG. 3, the intermediate plate 15 is a transmission window blocking plate 43, described hereafter, and also a partition plate that partitions the interior of the casing 2 into a setup space 2a for the irradiating unit 12 and a setup space 2b for the detecting unit 13.

The irradiating mirror 123 and the detecting mirror 132 are collectively referred to as a mirror module 14. The mirror module 14 and the intermediate plate 15 are configured in an integrated manner.

The motor 16 is arranged in a portion below the mirror module 14. The motor 16 rotates the mirror module 14 and the intermediate plate 15 around a rotation axis along the Y-axis direction.

3. Configuration of the Cover

Figure 4:
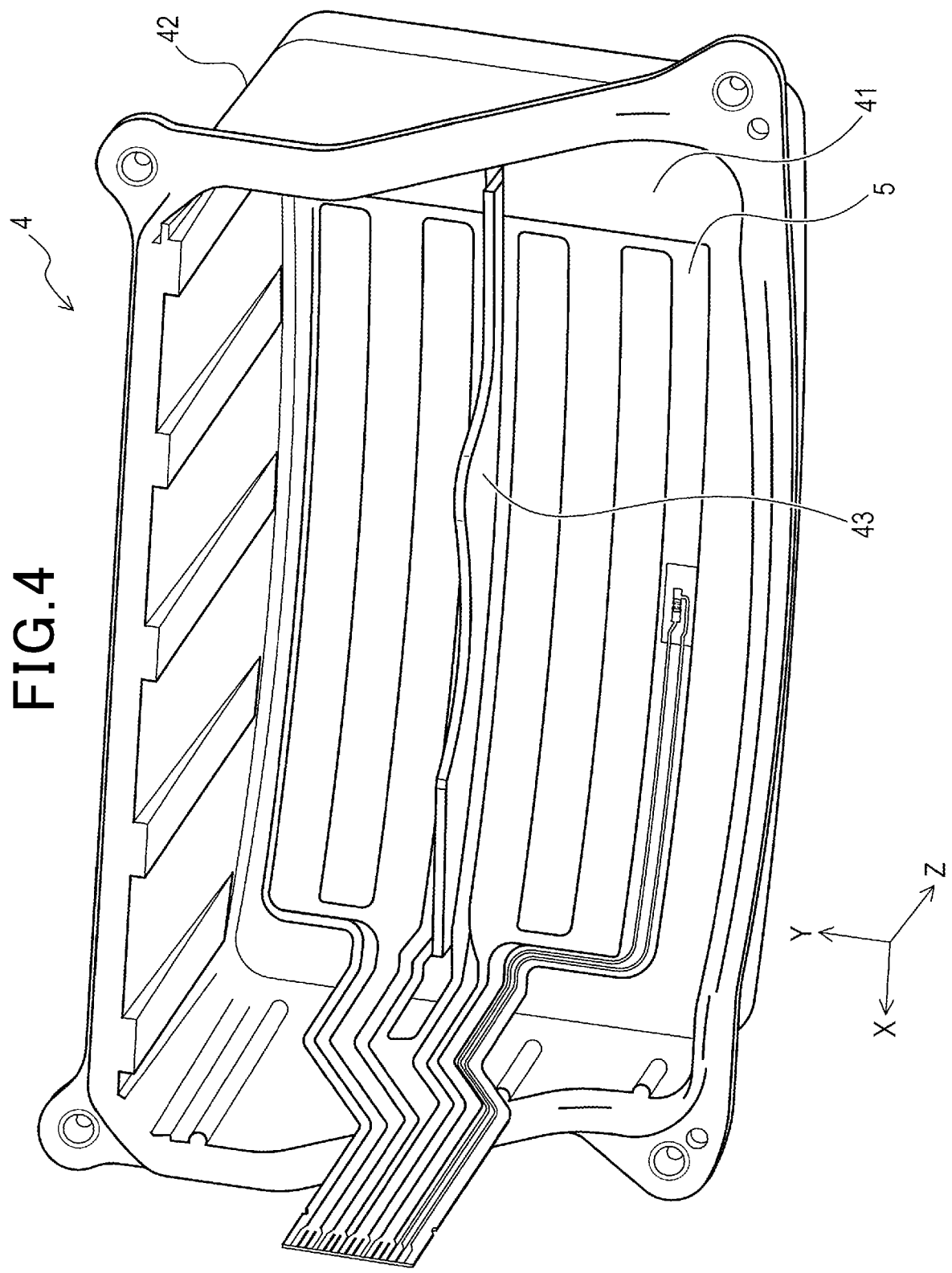
FIG. 4 is a perspective view of a configuration of an inner surface of a cover.

As shown in FIG. 1 and FIG. 4, the cover 4 includes the transmission window 41, a frame body 42, and the transmission window blocking plate 43 that is provided on an inner surface of the transmission window 41.

As described above, the transmission window 41 is a portion of the cover 4 that is arranged so as to oppose the detection module 10, and through which the emission light and the reflected light pass. The transmission window 41 is formed into a curved-surface shape that protrudes towards outside the casing 2.

The frame body 42 is a frame-shaped member that extends from an outer periphery of the transmission window 41 towards the rear side. The frame body 42 is formed by a resin material that inhibits transmission of laser light that is emitted from the light sources 121 and 122.

As shown in FIG. 4, the transmission window blocking plate 43 is a plate-shaped member that is provided along the X-axis direction so as to protrude from the inner surface of the transmission window 41. As shown in FIG. 3, the transmission window blocking plate 43 partitions a space between the mirror module 14 and the transmission window 41 into the irradiating unit 12 side and the detecting unit 13 side. The transmission window blocking plate 43 is formed by a resin material that inhibits the transmission of laser light that is emitted from the light sources 121 and 122, and suppresses the emission light that is diffusely reflected inside the setup space 2a of the irradiating unit 12 inside the casing 2 from being incident on the setup space 2b of the detecting unit 13.

Figure 5:
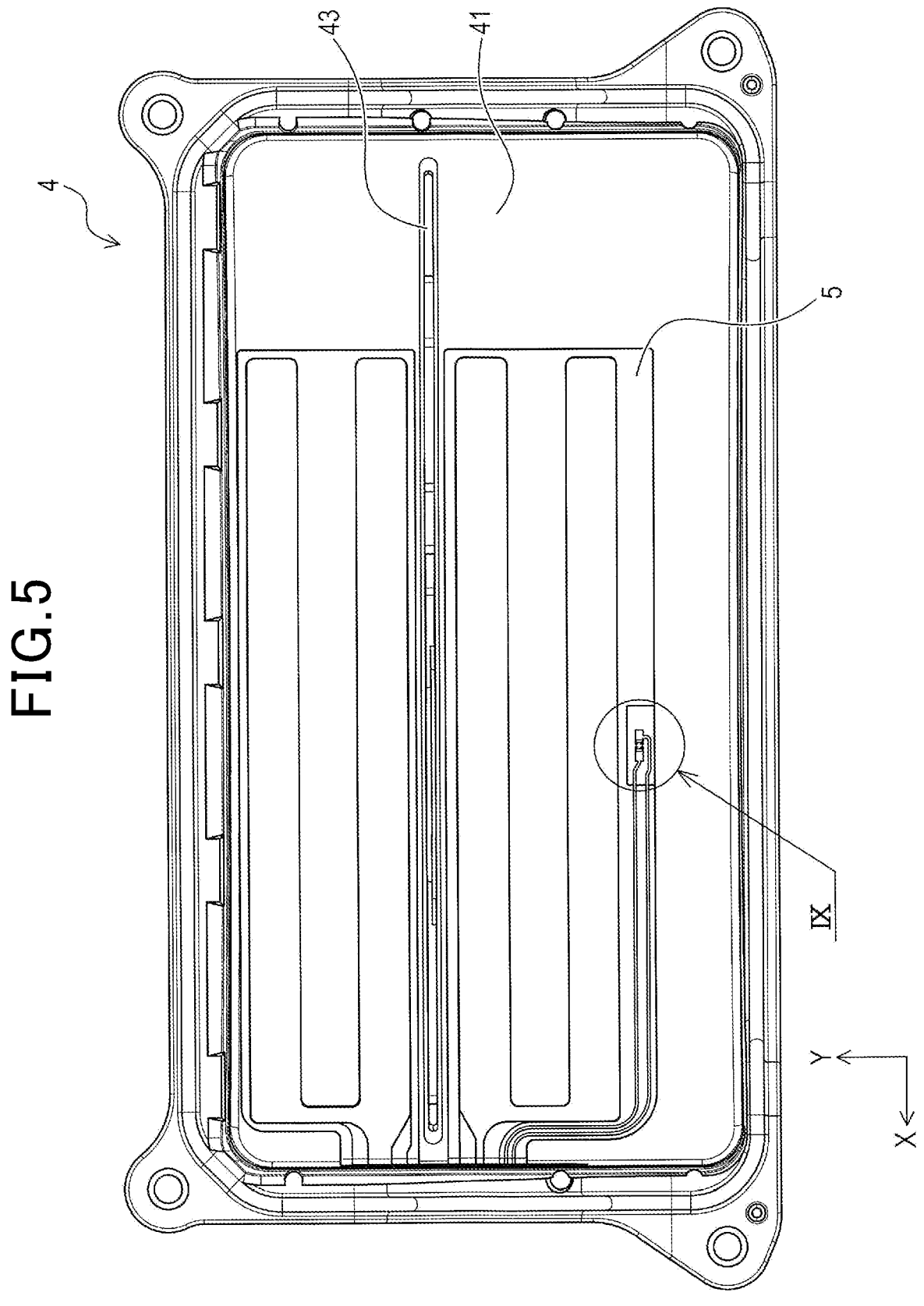
FIG. 5 is a diagram illustrating the configuration of the inner surface of the cover.

As shown in FIG. 4 and FIG. 5, the flexible substrate 5 in which a heater wire 51 that heats the transmission window 41 is formed is attached to the inner surface of the transmission window 41.

4. Configuration of the Flexible Substrate

Figure 6:
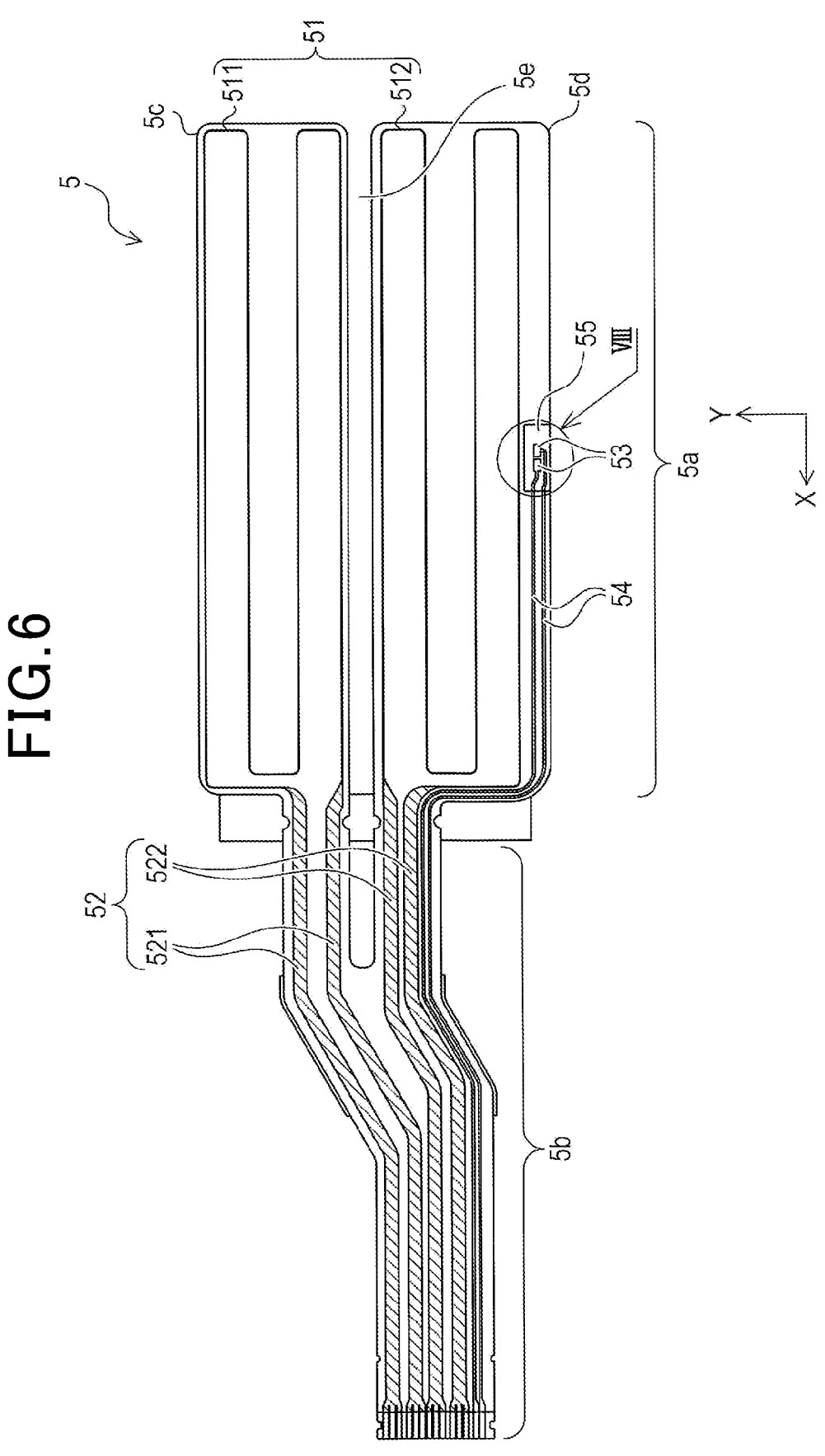
FIG. 6 is a diagram illustrating a flexible substrate.
Figure 7:
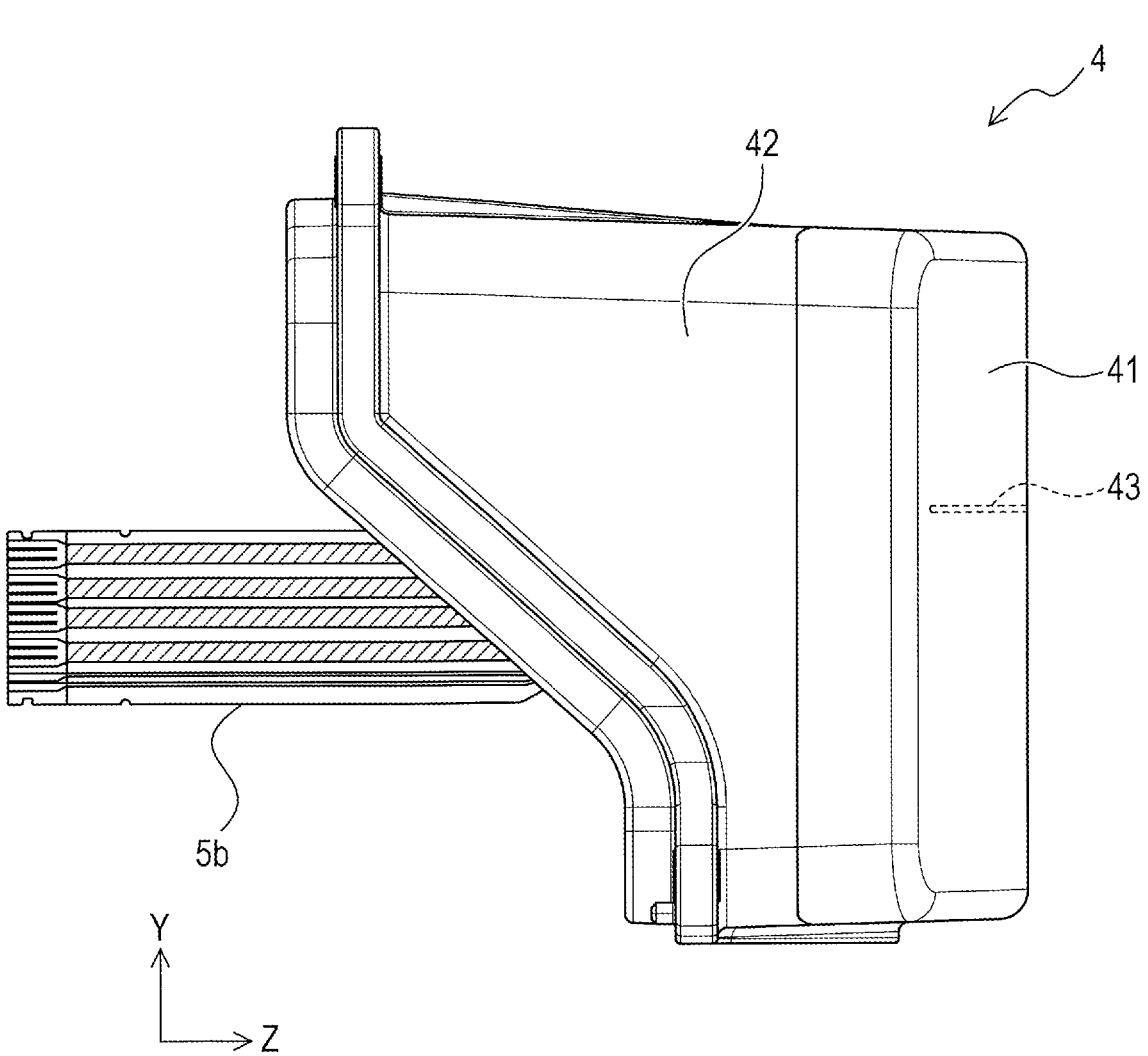
FIG. 7 is a diagram illustrating the cover, viewed from a side view.

As shown in FIG. 5 and FIG. 6, the flexible substrate 5 is a printed substrate in which various types of wiring patterns are formed on a film-like insulated substrate. The flexible substrate 5 is bent towards the rear side of the casing 2, as shown in FIG. 7, in an end portion of the inner surface of the transmission window 41. The flexible substrate 5 includes a heater unit 5a and a wiring portion 5b. The heater unit 5a is a portion of the flexible substrate 5 that is attached to the inner surface of the transmission window 41. The wiring portion 5b is a portion that extends towards the rear of the casing 2. The wiring portion 5b is such that a width in the Y-axis direction is thinner than that of the heater unit 5a.

Figure 8:
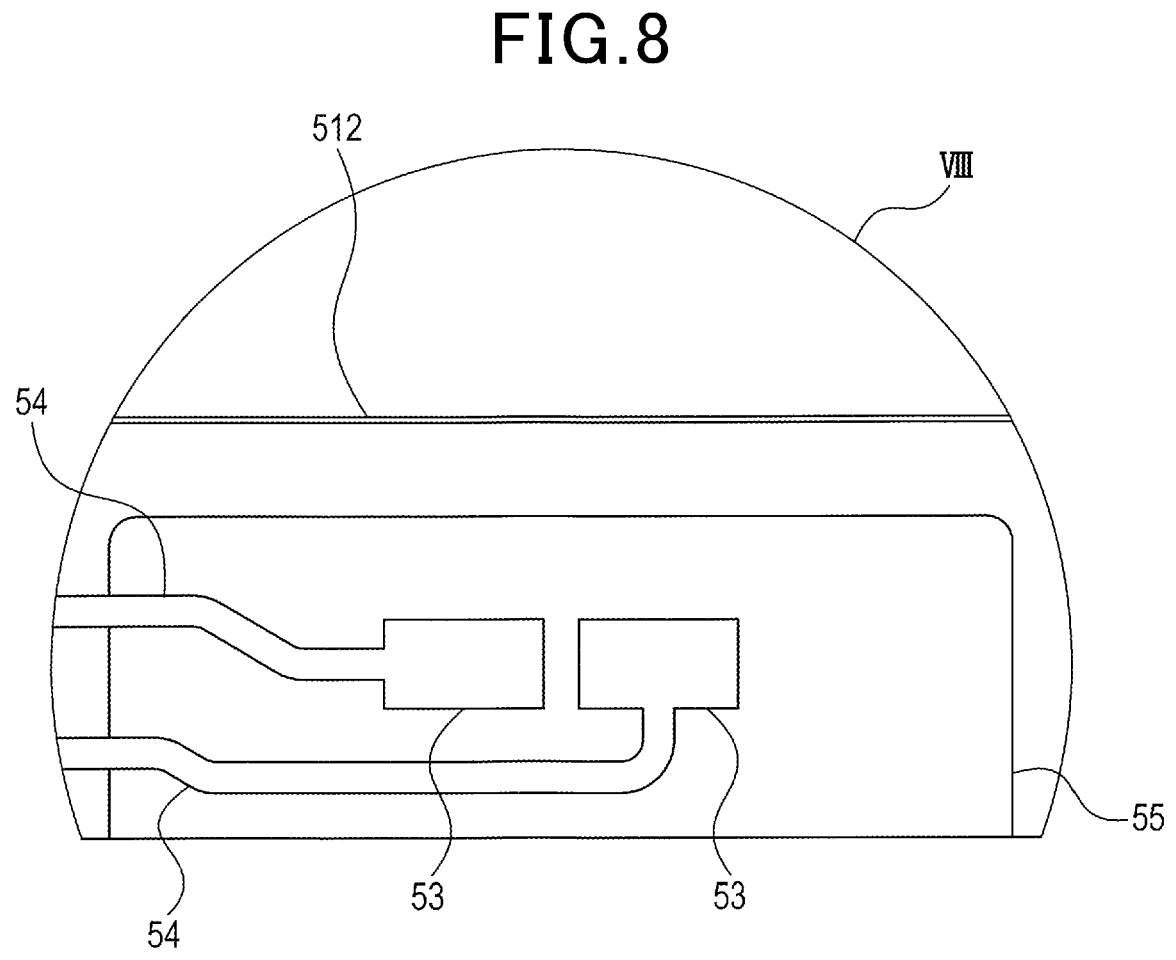

In the flexible substrate 5, the heater wire 51, wiring 52 to the heater wire 51 (referred to, hereafter, as heater wiring 52), two lands 53 for mounting an electronic component 6, and wiring 54 to the electronic component 6 that is connected to the lands 53 (referred to, hereafter, as electronic component wiring 54) are formed. These are formed by a conductor layer being laminated on a surface of the film-like insulated substrate and the conductor layer being etched. As the conductor, copper can be favorably used. Here, in FIG. 6 and FIG. 8, a state in which the electronic component 6 is not mounted is shown.

The heater wire 51 is formed in the heater unit 5a of the flexible substrate 5. The heater wire 51 includes an irradiation-side heater wire 511 that heats an area through which the emission light passes, and a detection-side heater wire 512 that heats an area through which the reflected light that is detected by the detecting unit 13 passes.

As shown in FIG. 6, the flexible substrate 5 is divided into an irradiation-side heater unit 5c in which the irradiation-side heater wire 511 is formed and a detection-side heater unit 5d in which the detection-side heater wire 512 is formed, in the heater unit 5a. A gap 5e is formed between the irradiation-side heater unit 5c and the detection-side heater unit 5d. As shown in FIG. 5, in the gap 5e, the transmission window blocking plate 43 is positioned in a state in which the heater unit 5a is attached to the inner surface of the transmission window 41.

The heater wiring 52 is formed in the wiring portion 5b, and connected to the heater wire 51 near a boundary between the heater unit 5a and the wiring portion 5b. The heater wiring 52 includes irradiation-side heater wiring 521 that is connected to the irradiation-side heater wire 511 and detection-side heater wiring 522 that is connected to the detection-side heater wire 512.

The land 53 is formed in an area of the heater unit 5a in which the heater wire 51 is not formed. Specifically, the land 53 is formed on a lower side of the detection-side heater wire 512 near a center of the detection-side heater unit 5d.

The electronic component wiring 54 is formed so as to extend from the wiring portion 5b to the heater unit 5a, and is connected to the land 53 at a terminal end thereof.

A topmost surface of the flexible substrate 5 is covered by an insulating resin film to protect the wiring patterns. An opening 55 is formed in a portion of the resin film and the land 53 is exposed from the opening 55. The land 53 is protected by Ni plating, gold plating, and the like that are further applied to the conductor layer.

Figure 9:
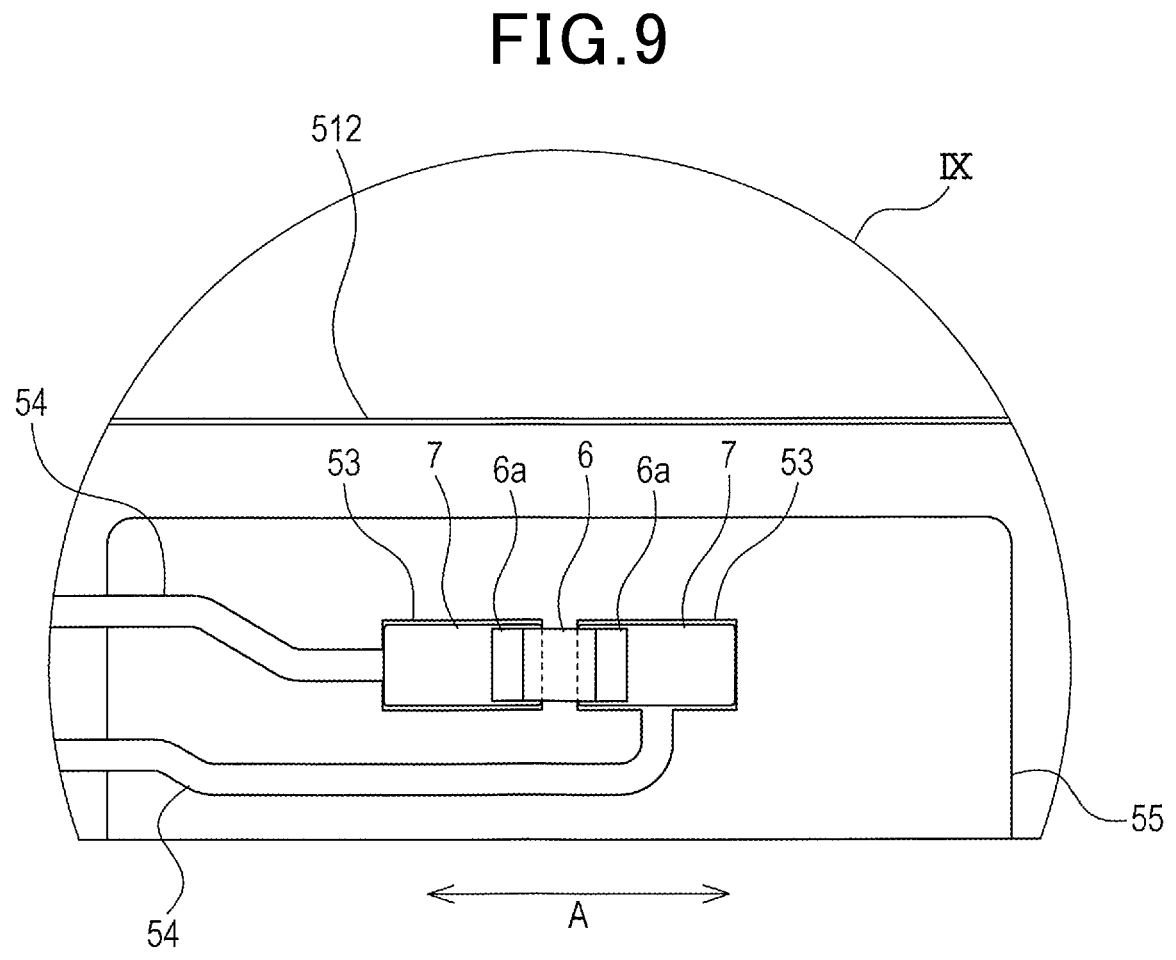
Figure 10:
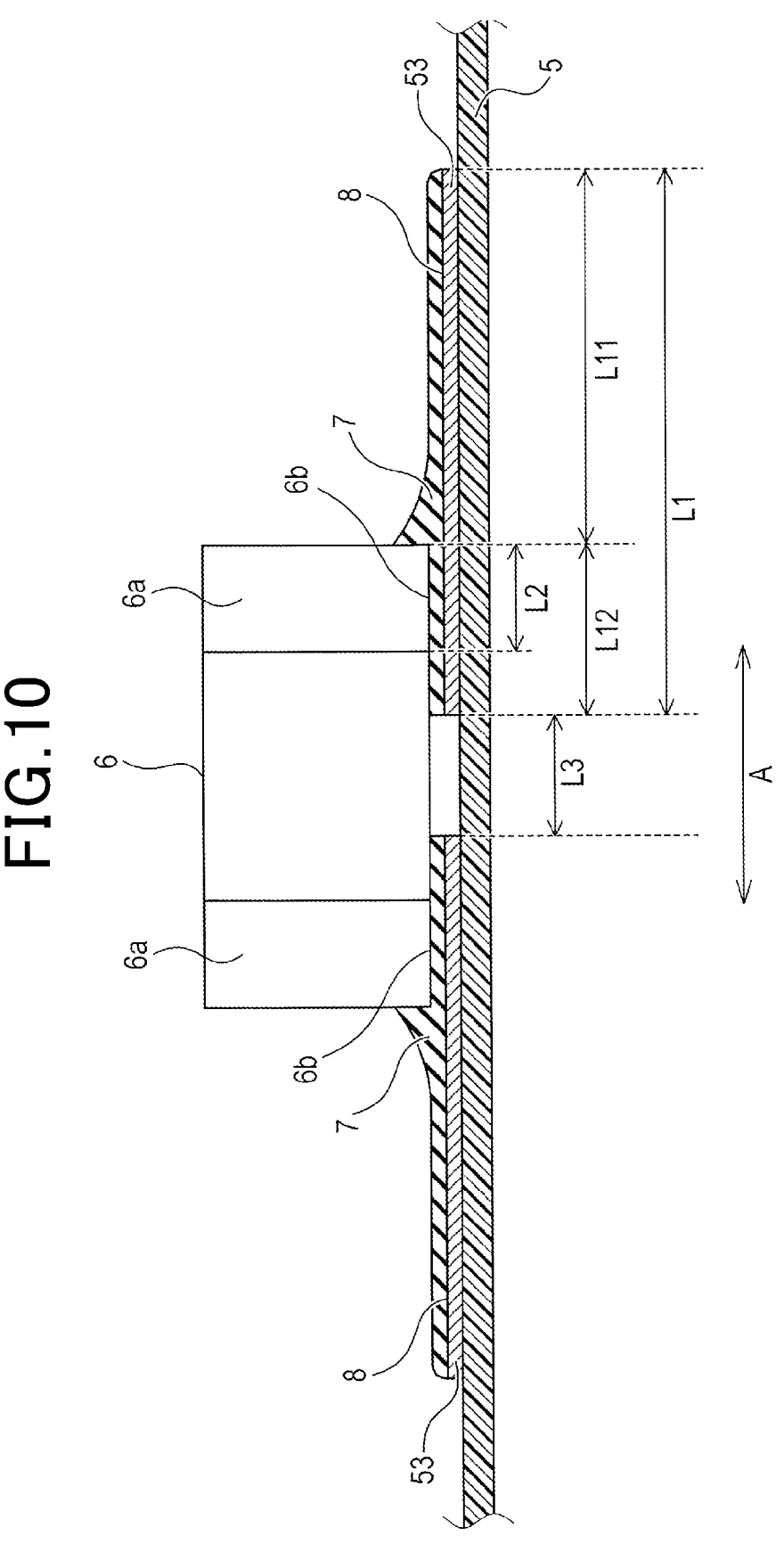
FIG. 10 is a cross-sectional view of a mounting portion of an electronic component.

As shown in FIG. 9 and FIG. 10, the electronic component 6 is mounted to the lands 53.

The electronic component 6 is a thermistor that detects a temperature of the transmission window 41 and used for heating control of the transmission window 41 using the heater wire 51. In addition, the electronic component 6 is a surface-mounted-type electronic component. The surface-mounted-type electronic component is also referred to as a chip-type electronic component. The electronic component 6 has a rectangular parallelopiped shape. The electronic component 6 has electrodes 6a at both ends in a longitudinal direction of the electronic component 6. Specifically, as shown in FIG. 9 and FIG. 10, when the longitudinal direction of the electronic component 6 on a surface that opposes the land 53 is an A direction (corresponding to a reference direction), both end portions in the A direction of a rectangular parallelopiped-shaped thermistor-chip main body are the electrodes 6a.

The electronic component 6 is electrically connected to the lands 53 via a conductive adhesive 7. The conductive adhesive 7 is a curable resin, such as an epoxy resin or a urethane resin in which a conductive filler, such as a metal filler containing Cu, Ni, Ag, or the like, or a carbon-based filler containing graphite or the like, is dispersed. The conductive adhesive 7 is formed on the land 53 at a size similar to the land 53 and adheres the electrode 6a of the electronic component 6 and the land 53. Specifically, the electronic component 6 is mounted such that, after a pattern of the conductive adhesive 7 before curing is formed on the lands 53, the electronic component 6 is mounted so as to straddle the two lands 53, and the conductive adhesive 7 is cured by heat.

The size of the land 53 is larger than a mounting surface 6b of the electrode 6a of the electronic component 6. Here, the mounting surface 6b of the electrode 6a is a surface of the electrode 6a that opposes the land 53 and is a surface that comes into contact with the conductive adhesive 7.

Specifically, as shown in FIG. 10, a length L1 along the A direction of a contact surface 8 between the land 53 and the conductive adhesive 7 is equal to or greater than twice a length L2 along the A direction of the mounting surface 6b of the electrode 6a of the electronic component 6, preferably equal to or greater than three times the length L2, and more preferably greater than three times the length L2. In general, a land on a printed substrate is formed to be a size that is similar to a mounting surface of an electrode of an electronic component to be electrically connected. In addition, in the printed substrate, the land is ordinarily not made larger than required, because components are typically required to be arranged at high density from the perspective of cost, size reduction, and the like. In this regard, in the present disclosure, a dimension of the land 53 along the A direction is made significantly larger than a standard land dimension.

Furthermore, as a distance L3 of a gap between the two lands 53, an insulating distance at which a short circuit does not occur is required to be ensured. When the length L1 of the contact surface 8 is relatively long such as equal to or greater than twice the length L2 of the mounting surface 6b of the electrode 6a, because there is a limit to extending the land 53 towards a center of the electronic component 6 in the A direction, the land 53 is preferably extended in a direction towards an outer side of the electronic component 6. As a result, in the A direction, with an end of the electronic component 6 along the A direction as a boundary, a length L11 of the land 53 that is further outside the electronic component 6 than the end of the electronic component 6 is is longer than a length L12 of the land 53 that is further towards the electronic component 6 side than the end of the electronic component 6 is.

5. Effects

According to the embodiment described in detail above, following effects are achieved.

(5a) The length L1 along the A direction of the contact surface 8 between the land 53 and the conductive adhesive 7 is equal to or greater than twice the length L2 along the A direction of the mounting surface 6b of the electrode 6a of the electronic component 6. Consequently, due to a reason below, peeling in an adhesive portion of the electronic component 6 that is mounted on the flexible substrate 5 does not easily occur, and electrical reliability is high.

An expansion width and a contraction width of the electronic component 6 due to temperature changes are greatest in the A direction that is the longitudinal direction of the electronic component 6. Therefore, regarding peeling at an interface between the conductive adhesive 7 and the land 53, peeling that progresses along the A direction of the electronic component 6 tends to most easily occur. According to the above-described embodiment, the length L1 of the contact surface 8 between the land 53 and the conductive adhesive 7 along this A direction is equal to or greater than the length L2 of the mounting surface 6b of the electrode 6a of the electronic component 6 along this same A direction. Consequently, even if peeling partially occurs in the interface between the land 53 and the conductive adhesive 7 on the flexible substrate 5, because electrical connection can be sufficiently ensured in areas that have not peeled, electrical reliability is high.

(5b) In the A direction, with the end of the electronic component 6 along the A direction as a boundary, the length L11 of the land 53 that is further outside the electronic component 6 than the end of the electronic component 6 is is longer than the length L12 of the land 53 that is further towards the electronic component 6 side than the end of the electronic component 6 is. That is, because the length L1 of the contact surface 8 is equal to or greater than twice the length L2 of the mounting surface 6b of the electrode 6a as described above, rather than the land 53 being extended in the direction towards the center of the electronic component 6, the land 53 is extended in the direction towards the outer side of the electronic component 6. Consequently, an insulating distance at which a short circuit does not occur can be more easily ensured as the distance L3 between the two lands 53.

6. Other Embodiments

An embodiment of the present disclosure is described above. However, the present disclosure is not limited to the above-described embodiment. It goes without saying that various embodiments are possible.

(6*a*) According to the above-described embodiment, the electronic component 6 is a thermistor. However, the electronic component 6 is not limited thereto. For example, the electronic component 6 may be a control element that controls a cleaning apparatus for the transmission window 41, such as a washer that cleans an outer side of the transmission window 41 with a cleaning liquid.

(6*b*) According to the above-described embodiment, the electronic component 6 is such that both end portions in the A direction of the rectangular parallelopiped-shaped thermistor-chip main body are the electrodes 6*a*. However, the shape of the electrodes 6*a* of the electronic component 6 is not limited thereto. For example, the electronic component 6 may be such that a gull-wing lead is attached to a side surface of the thermistor-chip main body. In addition, positions of the electrodes 6*a* in the electronic component 6 may be both ends in a transverse direction rather than the longitudinal direction.

(6*c*) According to the above-described embodiment, in both of the two lands 53, the length L1 along the A direction of the contact surface 8 between the land 53 and the conductive adhesive 7 is equal to or greater that twice the length L2 along the A direction of the mounting surface 6*b* of the electrode 6*a* of the electronic component 6. However, only one of the two lands 53 may be configured in this manner.

(6*d*) According to the above-described embodiment, the heater wire 51 and the electronic component 6 are both provided on the single flexible substrate 51. However, the heater wire 51 and the electronic component 6 may be provided on separate flexible substrates.

(6*e*) According to the above-described embodiment, the distance measurement apparatus 1 is mounted on the front side of the vehicle. However, a mounting position of the distance measurement apparatus 1 in the vehicle is not limited thereto. For example, the distance measurement apparatus 1 may be mounted to a periphery, such as a side or rear, of the vehicle.

(6*f*) A function provided by a single constituent element according to the above-described embodiments may be dispersed as a plurality of constituent elements. Functions provided by a plurality of constituent elements may be integrated into a single constituent element. In addition, a part of a configuration according to the above-described embodiments may be omitted. Furthermore, at least a part of a configuration according to the above-described embodiments may be added to or replace a configuration of another of the above-described embodiments.

What is claimed is:

1. A distance measurement apparatus that is configured to measure a distance to an object by irradiating emission light and detecting reflected light from the object onto which the emission light is irradiated, the distance measurement apparatus comprising:

a transmission window that is configured such that the emission light and the reflected light pass therethrough;

a heater wire that is configured to heat the transmission window; and a flexible substrate that is provided in the transmission window, wherein the flexible substrate includes a surface-mounted-type electronic component, a land to which an electrode of the electronic component is electrically connected, and a conductive adhesive that is formed on the land, and adheres the electrode of the electronic component and the land, and when a longitudinal direction of a surface of the electronic component that opposes the land is a reference direction, a length along the reference direction of a contact surface between the land and the conductive adhesive is equal to or greater than twice a length along the reference direction of a mounting surface of the electrode of the electronic component.

2. The distance measurement apparatus according to claim 1, wherein:

in the reference direction, with an end of the electronic component along the reference direction as a boundary, a length of the land that is further outside the electronic component than the end of the electronic component is longer than a length of the land that is further towards the electronic component side than the end of the electronic component is.

3. The distance measurement apparatus according to claim 2, wherein:

the electronic component is a thermistor.

4. The distance measurement apparatus according to claim 1, wherein:

the electronic component is a thermistor.

5. The distance measurement apparatus according to claim 1, wherein:

the distance measurement apparatus is mountable to a vehicle.

* * * * *